(12) United States Patent
Goldschlager et al.

(10) Patent No.: US 9,509,579 B1
(45) Date of Patent: Nov. 29, 2016

(54) LINK ATTRIBUTES DISPLAY

(71) Applicant: Marvell International Ltd., Hamilton (BM)

(72) Inventors: Robi Goldschlager, Tel-Aviv (IL); Ronen Tausi, Raanana (IL); Gad Hutt, Sunnyvale, CA (US)

(73) Assignee: Marvell Israel (M.I.S.L) Ltd., Hamilton (BM)

( * ) Notice: Subject to any disclaimer, the term of this patent is extended or adjusted under 35 U.S.C. 154(b) by 225 days.

(21) Appl. No.: 14/073,033

(22) Filed: Nov. 6, 2013

Related U.S. Application Data

(60) Provisional application No. 61/725,170, filed on Nov. 12, 2012.

(51) Int. Cl.
*G06F 3/048* (2013.01)
*H04L 12/26* (2006.01)

(52) U.S. Cl.
CPC .................................. *H04L 43/045* (2013.01)

(58) Field of Classification Search
None
See application file for complete search history.

(56) References Cited

U.S. PATENT DOCUMENTS

| 2003/0115361 | A1* | 6/2003 | Kirk et al. ............... 709/244 |
| 2007/0204231 | A1* | 8/2007 | Cunningham .......... H04L 41/22 715/734 |
| 2012/0178439 | A1* | 7/2012 | Vashi .................... H04L 1/1887 455/424 |

OTHER PUBLICATIONS

Robi Goldschlager et al., U.S. Appl. No. 14/102,665, "Network Traffic View", filed Dec. 11, 2013.
Robi Goldschlager et al., U.S. Appl. No. 14/078,013, "Cable Discovery", filed Nov. 12, 2013.
Robi Goldschlager et al., U.S. Appl. No. 14/056,237, "Method and Apparatus for Path Indication", filed Oct. 17, 2013.

* cited by examiner

*Primary Examiner* — William Trapanese

(57) ABSTRACT

A method for providing Layer 2 link attributes to a user includes transmitting a query using a Layer 3 network protocol to at least a first network element to determine a link attribute for a Layer 2 link between the first network element and a second network element in a network, receiving a response indicative of the link attribute for the Layer 2 link, determining based on the received response a graphical line attribute corresponding to the link attribute according to a predetermined mapping of link attributes to graphical line attributes, and updating a line element at a graphical user interface according to the graphical line attribute, the line element connecting at the graphical user interface a first graphical element corresponding to the first network element and a second graphical element corresponding to the second network element.

20 Claims, 3 Drawing Sheets

LINK ATTRIBUTES DISPLAY

INCORPORATION BY REFERENCE

This present disclosure claims the benefit of U.S. Provisional Application No. 61/725,170, "LINK ATTRIBUTES DISPLAY" filed on Nov. 12, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A local area network (LAN) is a computer network that interconnects computers in a limited area such as a home, school, computer laboratory, or office building. Further, in a LAN, computers can be grouped into domains, such as virtual LANs (VLANs) and the like. In an example, computers in the same VLAN communicate using Layer 2 or Layer 3 communication, while computers typically communicate with computers in different VLANs only using higher layers, such as Layer 3 communication, and the like.

SUMMARY

Aspects of the disclosure provide a method for providing attributes of a Layer 2 link to a user. The method includes transmitting a query using a Layer 3 network protocol, by a processor, to at least a first network element to determine a link attribute for a Layer 2 link between the first network element and a second network element in a network, receiving, by the processor, a response indicative of the link attribute for the Layer 2 link, determining based on the received response a graphical line attribute corresponding to the link attribute according to a predetermined mapping of link attributes to graphical line attributes, and updating a line element at a graphical user interface according to the graphical line attribute, the line element connecting at the graphical user interface a first graphical element corresponding to the first network element and a second graphical element corresponding to the second network element.

To receive the response indicative of the link attribute for the Layer 2 link, in an example, the method includes receiving the response indicative of at least one of an up/down state of the Layer 2 link, a speed of the Layer 2 link and a throughput of the Layer 2 link. In another example, the method includes receiving an indication of an operational status of one or more of the first network element and the second network element.

According to an aspect of the disclosure, the method includes determining the first network element to transmit the query based on a network topology stored in a database associated with the processor. In an embodiment, the method includes determining a link attribute based a present response and a stored response.

In an example, the method includes selecting a switch element from the first network element and the second network element, and querying the switch element for the link attribute of the Layer 2 link connecting the first network element and the second network element. To query the switch element for the link attribute of the Layer 2 link, the method includes querying a value of a counter. The counter is configured to count a number of data units transmitted over the Layer 2 link. The method then includes determining the link attribute based on a change of the value over time.

Aspects of the disclosure provide an apparatus that includes a controller. The controller is configured to transmit a query using a Layer 3 network protocol to at least a first network element to determine a link attribute for a Layer 2 link between the first network element and a second network element in a network, receive a response indicative of the link attribute for the Layer 2 link, determine based on the received response a graphical line attribute corresponding to the link attribute according to a predetermined mapping of graphical line attributes to link attributes, and update a line element at a graphical user interface according to the graphical line attribute, the line element connecting at the graphical user interface a first graphical element corresponding to the first network element and a second graphical element corresponding to the second network element.

Aspects of the disclosure provide a non-transitory computer readable medium storing program instructions for causing a processor to execute operations for providing Layer 2 link attributes to a user. The operations include transmitting a query using a Layer 3 network protocol, by a processor, to at least a first network element to determine a link attribute for a Layer 2 link between the first network element and a second network element in a network, receiving, by the processor, a response indicative of the link attribute for the Layer 2 link, determining based on the received response a graphical line attribute corresponding to the link attribute according to a predetermined mapping of graphical line attributes to link attributes, and updating a line element at a graphical user interface according to the graphical line attribute, the line element connecting at the graphical user interface a first graphical element corresponding to the first network element and a second graphical element corresponding to the second network element.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
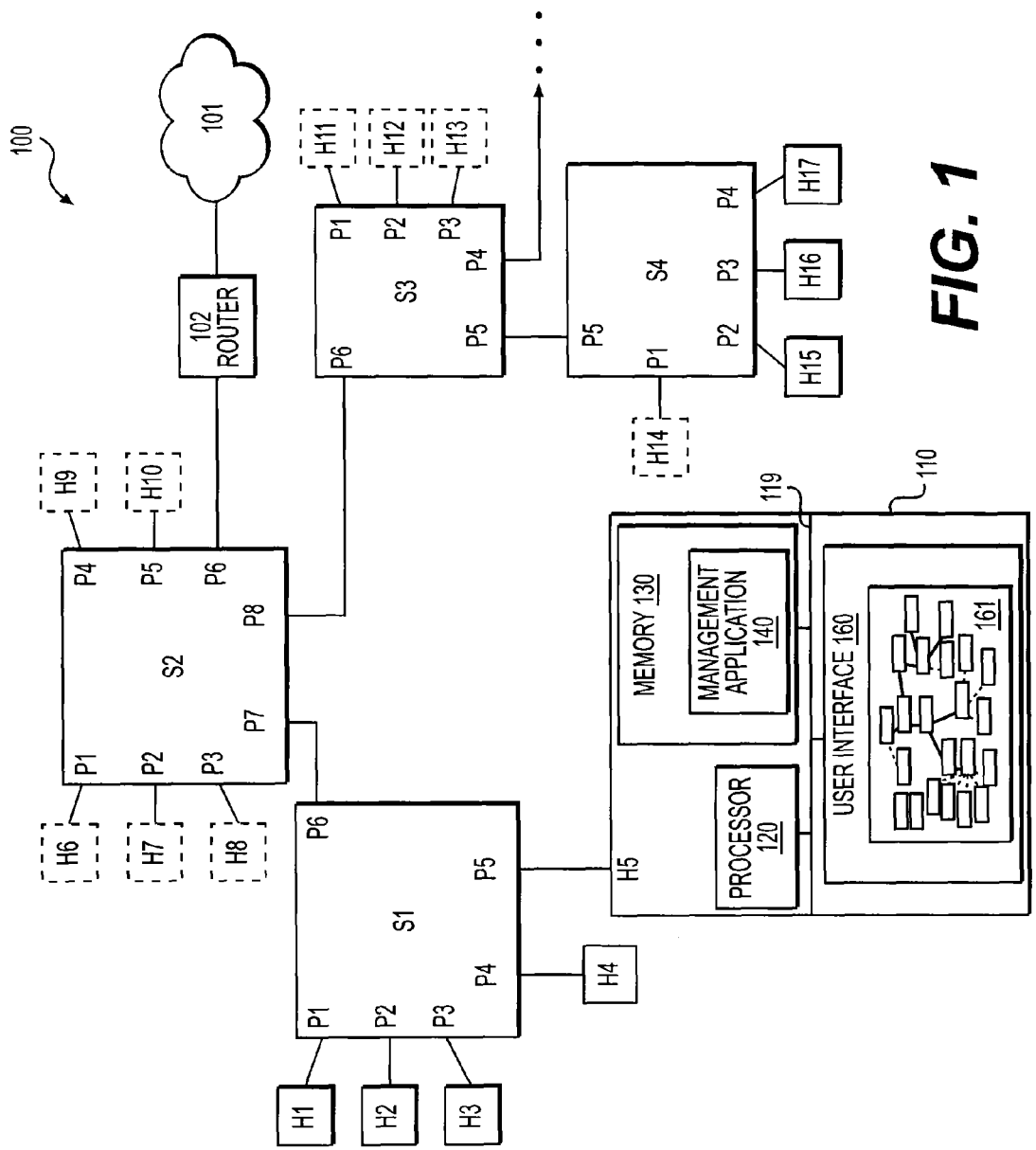
FIG. 1 shows a block diagram of a network example 100 according to an embodiment of the disclosure.

FIG. 1 shows a block diagram of a network example 100 according to an embodiment of the disclosure. In an example, the network 100 includes a plurality of devices coupled together to form a plurality of nodes in the network 100. For example, the network 100 includes host devices, such as host devices H1-H17 and the like, that form host nodes. Further, the network 100 includes switch devices, such as switch devices S1-S4 and the like, that form the switch nodes. It is noted that the network 100 includes other switch devices and host devices that are not shown. In an example, the non-shown portion is coupled to the switch device S3 in FIG. 1.

Among the devices, at least one device, such as the host device H5, is configured to enable queries of Layer 2 link attributes in the network 100 using higher levels of communication protocol, such as Layer 3 communication, and inform the Layer 2 link attributes to a user via a user interface.

The network 100 can be any suitable network. In an example, the network 100 is a local area network (LAN) 100. The LAN 100 is a Layer 2 network that uses a data link protocol, such as Ethernet protocol, and the like, for communication between hosts in the LAN. In the FIG. 1 example, the LAN 100 is coupled to Internet 101 via a router 102 for example. In an example, communication to the Internet 101 crosses the border of the LAN 100 and continues using a higher level protocol, such as Layer 3 protocol, and the like.

The host devices H1-H17 can be any suitable devices, such as voice over IP (VoIP) phones, computers, laptops, TVs, servers, and the like that are configured to be a source of network traffic and/or a destination of network traffic. Generally, a host device includes one or more network interface controllers (NICs) connected to the switch devices via wired or wireless connection media. It is noted that when the host device includes multiple NICs connected to the switch devices, the host device is considered as a set of devices and each connection has its own MAC address. The host devices communicate with each other via the switch devices.

The switch devices S1-S4 can be any suitable switch devices. Generally, a switch device includes a plurality of ports connected to host devices and/or other switch devices. The switch device is configured to receive a network traffic unit (e.g., a data link frame) from a port (e.g., ingress port) and forward the received network traffic unit to one or more ports (e.g., egress ports) based on network configuration information. In an embodiment, a switch device includes a plurality of tables storing network configuration information. The network configuration information includes, for example, port connectivity information of the switch device, port connectivity information of other switch devices in the LAN 100, virtual LAN (VLAN) configuration, and the like. In an example, the network configuration information is changed via a software program application by a network administrator.

Generally, a large amount of multicast and/or broadcast traffic is transmitted in a LAN. When the LAN has a large number of devices, such as hundreds of devices, some traffic ends up being sent to unnecessary destinations. According to an aspect of the disclosure, the LAN 100 is configured to include multiple sub-networks that use Layer 2 protocols for communication within a sub-network and use higher Layer protocols, such as a Layer 3 network protocol, and the like, for communication across borders of the sub-networks.

In an embodiment, computers and other devices operated by people in a workgroup tend to multicast or broadcast more messages to devices in the same workgroup than devices in the different workgroups. The computers are virtually grouped according to a workgroup to form a VLAN that uses multicast or broadcast for communication within the VLAN. Network traffic can be reduced by not broadcasting network traffic to devices in other workgroups (e.g., other VLANs). In an example, multiple workgroups or VLANs are configured in the LAN 100. Within a VLAN, data link frames are broadcasted using a Layer 2 protocol, in an embodiment. The VLANs are mutually isolated so that data link frames pass between the different VLANs using higher level protocols, such as network protocol and the like.

According to an aspect of the disclosure, a network administrator needs to be aware of present link status and link status changes in a network in real time, in order to quickly detect abnormality, and perform trouble shooting, for example. In an example, generally, a Layer 2 link is a physical link that uses a conductive media connecting two devices. In a Layer 2 network, according to Layer 2 protocol, Layer 2 links regularly transmit multicast or broadcast data units. Thus, in an example, when a network administrator is aware that a Layer 2 link has no traffic for a time duration, or the Layer 2 link changes from having a regular traffic to having no traffic, the network administrator can take further actions to diagnose issues with the Layer 2 link.

According to an embodiment of the disclosure, various parameters can be used to indicate link status. In an example, a link has an up/down state. Further, the link has a speed value that indicates a maximum transmission capability, such as 10 Mbps, 100 Mbps, 1 Gbps, 10 Gbps, and the like. In another example, the link has a throughput value that indicates a transmission rate, such as transmitted bits per second, transmitted bytes per second, frames transmitted per second, and the like.

According to an aspect of the disclosure, a management application is implemented in the LAN 100. The management application is configured to query selected devices, such as switch devices in the network, to determine attributes of links in the network, and provide the link attributes to a user, such as a network administrator, via a user interface. In the FIG. 1 example, the management application is implemented in a computer H5, labeled with reference numeral 110. The computer H5 is used for network administration and is coupled to port 5 (P5) of the switch device S1 in the FIG. 1 example.

In the FIG. 1 example, the computer H5 includes a processor 120, a memory module 130 and a user interface module 160 coupled together by a bus 119. The processor 120 executes system and application codes to perform system functions and application functions. The memory module 130 stores the system and application codes, such as codes 140 for the management application. In addition, the memory module 130 stores data processed or to be processed by the processor 120.

In an example, the memory module 130 stores network configuration information, such as a network topology for the LAN 100. The network topology includes, for example, coupling information of hosts to ports of the switches, coupling pairs of ports of different switches, relationship of workgroups to VLANs, VLAN membership, and the like. In an example, the memory module 130 stores a database (not shown) holding the network topology information, such as disclosed in Assignee's co-pending application Ser. No. 14/056,237, filed Oct. 17, 2013, which is incorporated herein by reference in its entirety. The memory module 130 can include any suitable memory, such as a hard disk drive, an optical storage medium, a solid-state drive, and the like.

In an embodiment, the processor 120 executes the codes 140 for the management application to access the network topology, and to provide the network topology to a user. It is noted that the network topology can be stored in another device in the LAN 100, such as in the switch devices S1, S2, S3, S4 and the like, and can be accessed by the processor 120.

The user interface module 160 enables communication between the computer 110 and a user. The user interface module 160 can include any suitable component, such as a touch screen, a display, a keyboard, a mouse, a printer, and the like. In the FIG. 1 example, the user interface module 160 includes a graphical user interface 161 to interact with a user, such as a network administrator in a graphical manner. For example, the GUI presents to the user a graphical network topology on a display screen. Specifically, the GUI uses suitable graphical elements, such as picture icons, to represent devices, such as the host devises, the switch devices and the like. In an example, the GUI includes laptop icons, desktop icons, phone icons, switch icons and the like to respectively represent the devices in the network 100 based on the types of devices.

Further, the GUI uses graphical line elements to represent links connecting the devices in the network 100. In addition, the GUI applies different line attributes to the graphical line elements to indicate different link attributes.

According to an aspect of the disclosure, the GUI can use any suitable graphical line attributes, such as color, thickness, animation parameters, and the like to indicate the different link attributes. In an example, the GUI uses a red line to indicate a down-state of a link, a green line to indicate an up-state of a link. In another example, the GUI uses a line thickness to indicate a speed of a link. For example, a thicker line indicates a higher transmission capability. In another example, the GUI uses animated elements, such as animated lines and the like, to illustrate network traffic in real-time. For example, the moving speed of an animated line is indicative of a throughput on a Layer 2 link represented by the animated line element.

Further, according to an aspect of the disclosure, each Layer 2 link in a network is connected with least one switch device. Generally, a switch device is configured to monitor network traffic coming into the switch device and/or going out of the switch device. In an example, a switch device includes counters associated with ports. A counter associated with an egress port counts a number of data units going out of the egress port, and a counter associated with an ingress port counts a number of data units coming into the ingress port. The counted value by a counter associated with a port is indicative of the network traffic on a Layer 2 link connected with the port.

Thus, in an embodiment, the management application can query the switch devices in the network 100 to request the counted values in the counters in order to determine the link attributes of the Layer 2 links in the network 100. In an example, the computer 110 regularly sends queries using a higher level protocol, such as Layer 3 protocol, and the like, to all the switch devices in the network. In response to the queries, the switch devices report the counted values of counters associated with ports to the computer 110. Based on the counted values, the computer 110 determines the link attributes for the Layer 2 links in the network 100.

In another example, the computer 110 identifies the Layer 2 Links in the network based on the network topology. Then, for each Layer 2 link, the computer 110 determines a switch device and one of its ports connected with the Layer 2 link. Further, the computer 110 sends a query using Layer 3 protocol to the determined switch device to request a counted value of a counter associated with the determined port. In response to the query, the switch device reports the counted value of the counter.

Further, the computer 110 includes a mapping of link attributes to graphical line attributes. In an example, the mapping is predetermined and stored in the computer 110, such as in the memory module 130. In another example, the computer 110 is configured to enable the user to select a graphical line attribute for each link attribute.

Based on the mapping, the computer 110 determines the graphical line attributes corresponding to the link attributes, and updates, according to the graphical line attributes, the line elements corresponding to the Layer 2 links at the GUI 161.

In addition, in an embodiment, the computer 110 stores a history of the Layer 2 link attributes. When the computer 110 receives a present Layer 2 link attribute for a Layer 2 link, the computer 110 determines a link attribute change for the Layer 2 link based on the present Layer 2 link attribute and the history. Further, the computer 110 determines a suitable graphical line attribute for the line element at the GUI 161 to indicate the link attribute change.

Figure 2:
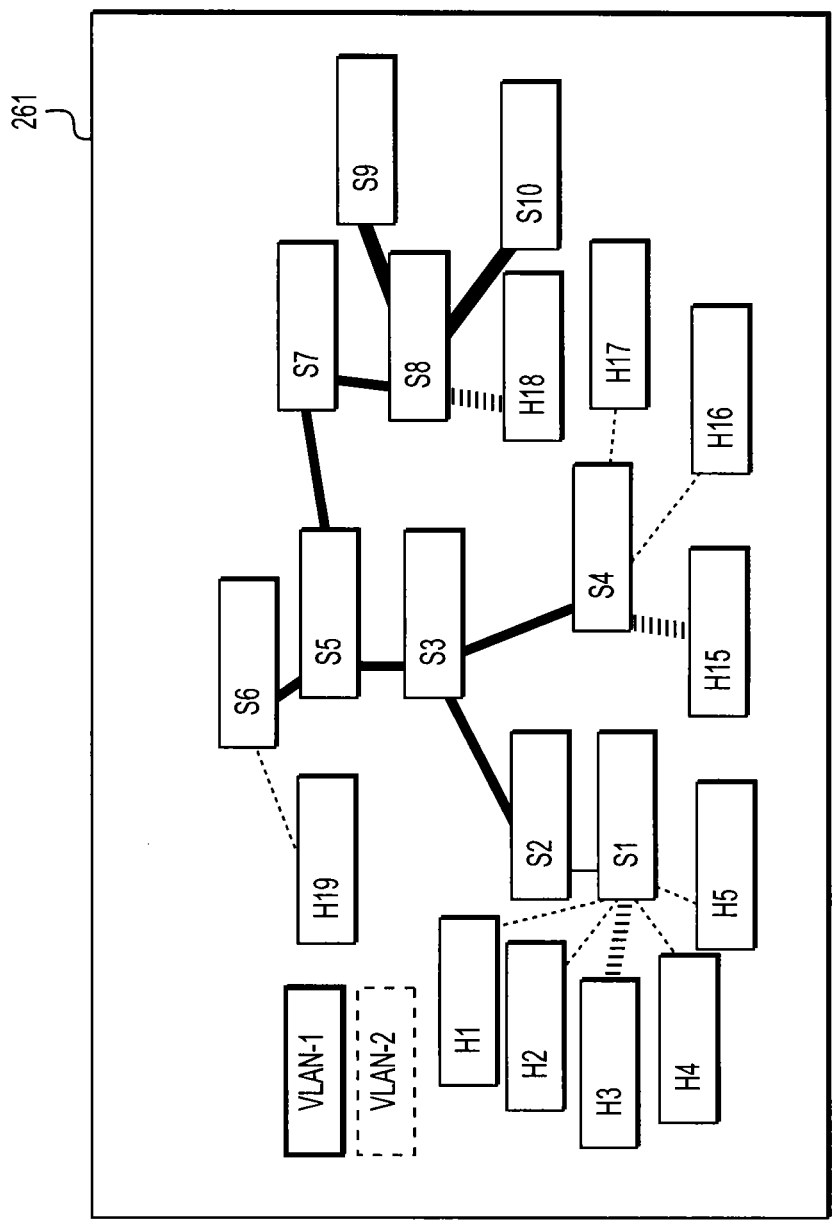
FIG. 2 shows a screenshot at a graphical user interface (GUI) 261 according to an embodiment of the disclosure.

FIG. 2 shows a screenshot example of a graphical user interface (GUI) 261 for the network 100 according to an embodiment of the disclosure. In the FIG. 2 example, the GUI 261 includes graphical selection elements VLAN-1 and VLAN-2 for view selections. In an example, the network 100 is configured to have a first VLAN (VLAN-1) and a second VLAN (VLAN-2). When the graphical selection element VLAN-1 is selected, the GUI 261 displays pictures icons for device members of the first VLAN and graphical line elements for links of the first VLAN. When the graphical selection element VLAN-2 is selected, the GUI 261 displays picture icons for device members of the second VLAN and graphical line elements for links of the second VLAN.

In an example, depicted in FIG. 1, the host devices H1-H5, and H15-H17 are members of the first VLAN, and the host devices H6-H14 are members of the second VLAN. Thus, in FIG. 2, because the graphical selection element VLAN-1 is selected, the GUI 261 displays the topology for the second VLAN, and link attributes for Layer 2 links in the second.

In the FIG. 2 example, the GUI 261 includes picture icons S1-S10 representing switch devices, and includes picture icons H1-H5 and H15-H19 representing host devices. Further, the GUI 261 uses graphical line elements to represent Layer 2 links. The graphical line elements have respective graphical line attributes that are indicative of respective link attributes for the corresponding Layer 2 links. In the FIG. 2 example, solid lines are used to represent links between switch devices, and dash lines are used to represent links between host devices and switch devices. Further, thicker lines represent higher speed for the Layer 2 links. In an example, the line element between the picture icons S1 and S2 is indicative of a 10 Mbps link capacity, the line element between the picture icons S2 and S3 is indicative of a 100 Mbps link capacity, the line element between the picture icons S8 and S10 is indicative of a 1 Gbps link capacity.

It is noted that the GUI 261 can be suitably modified to show other suitable views, such as throughput view, and the like. Further, the GUI 261 can include text information for the host devices and the switch devices. For example, the GUI 261 can display corresponding MAC address with a picture icon for a host device, and display a corresponding IP address with a picture icon for a switch device.

It is also noted that the GUI 261 can use animation techniques to illustrate the dynamics in the network. In an example, the dash lines between the host devices and the switch devices are configured with animation based on the volume of network traffic generated by the host devices or the volume of network traffic with destination at the host devices.

Figure 3:
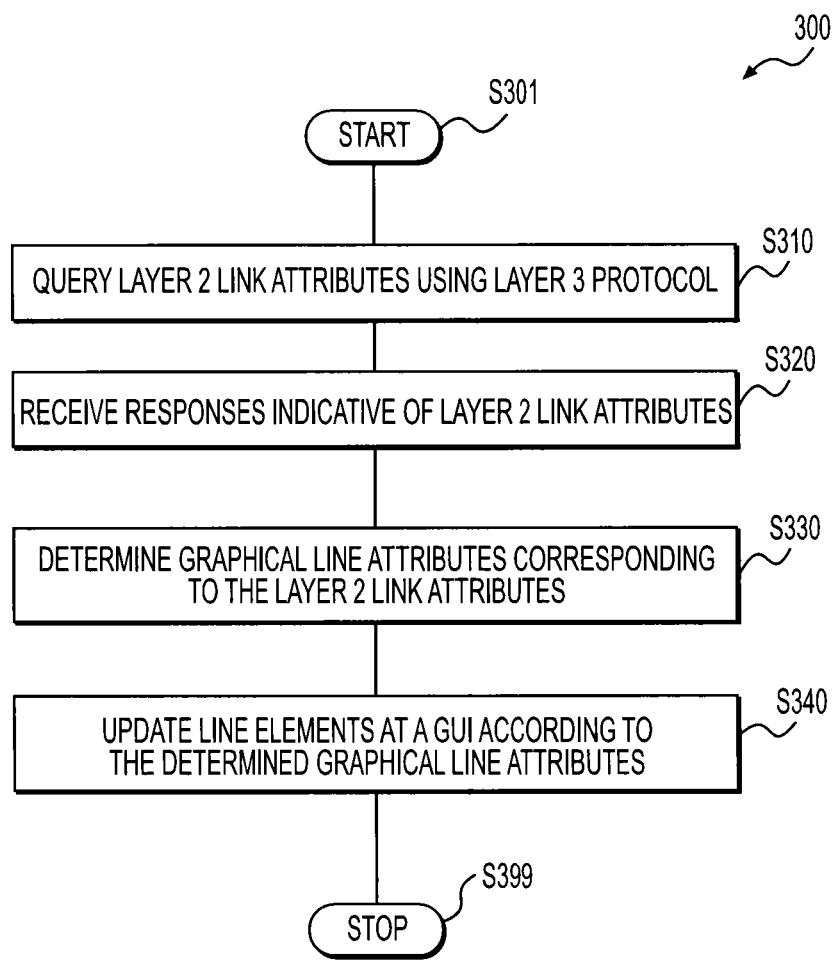
FIG. 3 shows a flow chart outlining a process example 300 according to an embodiment of the disclosure.

FIG. 3 shows a flow chart outlining a process example 300 according to an embodiment of the disclosure. In an example, in the computer 110, the processor 120 executes the codes 140 for the management application to perform the process 300. In an embodiment, the management application causes the computer 110 to present Layer 2 links in conjunction with a network topology to the network administrator via a GUI. At the GUI, the host devices and the switch devices are respectively represented by suitable picture icons, and the Layer 2 links are respectively represented by graphical line elements. The graphical line attributes for the line elements at the GUI are indicative of the Layer 2 link attributes. The process starts at S301, and proceeds to S310.

At S310, Layer 2 link attributes are queried using higher level protocols, such as Layer 3 protocols or other suitable higher level protocols, for example. In the FIG. 1 example, the memory 130 suitably stores a network topology of the network 100. Based on the network topology, the computer 110 identifies Layer 2 links, and sends queries to request link attributes, for example, regularly. In an example, the computer 110 identifies a Layer 2 link between the host device H15 and the switch device S4. Then, the computer 110 sends a query to the switch device S4 using a Layer 3 protocol. In an example, the query requests a value in a counter associated with the port P2 in the switch device S4. The counter counts, for example, transmitted bytes by the port P2.

At S320, responses indicative of the Layer 2 link attributes are received. In the FIG. 1 example, in response to the queries, the computer 110 receives responses. In an example, the computer 110 receives values in various counters associated with ports in the switch devices. In another example, the computer 110 receives operational status of the various switch devices and operational status of the various ports in the switch devices. The responses are indicative of the Layer 2 link attributes. For example, an operational status of a port is indicative of an up/down state of a link connected to the port. Further, the operational status can include a speed of the port. In addition, in an example, the computer 110 stores a history of the responses, and based on the history and currently received response, the computer 110 detects link attributes and link attribute changes. In an example, the computer 110 compares a stored value of a counter associated with a port and a currently received value of the counter, and based on a time duration between the two queries, the computer 110 calculates a throughput of the port. In another example, the computer 110 compares a previous throughput and a current throughput, and detects that a link attribute has changed from a regular throughput to no throughput, and then link abnormality is detected.

At S330, graphical line attributes corresponding to the Layer 2 link attributes are determined. In an embodiment, the computer 110 stores a predetermined mapping of Layer 2 link attributes to graphical line attributes. For example, an up-state maps to green line, a down state maps to a red line, a change from the up-state to the down state maps to a yellow line. In another example, different speeds map to different line thickness. In another example, different throughputs map to different animation parameters. In another embodiment, the computer 110 is configured to enable the user to define graphical line attribute for each Layer 2 link attribute, for example.

At S340, graphical line elements at the GUI are updated according to the determined graphical line attributes. Then, the process proceeds to S399 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for providing Layer 2 link attributes to a user, comprising:
   querying a value of a counter using a Layer 3 network protocol, by a processor, to at least a first network element, the counter being configured to count a number of data units transmitted over a Layer 2 link, to determine a link attribute for the Layer 2 link between the first network element and a second network element in a network based on the value of the counter;
   receiving, by the processor, a response indicative of the link attribute for the Layer 2 link, the response including at least an indication whether network traffic is flowing over the Layer 2 link between the first network element and the second network element;
   determining based on the received response a graphical line attribute corresponding to the link attribute according to a predetermined mapping of link attributes to graphical line attributes; and
   updating a line element at a graphical user interface according to the graphical line attribute, the line element connecting at the graphical user interface a first graphical element corresponding to the first network element and a second graphical element corresponding to the second network element.

2. The method of claim 1, wherein receiving the response indicative of the link attribute for the Layer 2 link further comprises:
   receiving the response indicative of at least one of an up/down state of the Layer 2 link, a speed of the Layer 2 link and a throughput of the Layer 2 link.

3. The method of claim 1, further comprising:
   determining the first network element to query based on a network topology stored in a database associated with the processor.

4. The method of claim 1, wherein receiving the response indicative of the link attribute for the Layer 2 link further comprises:
   receiving an indication of an operational status of one or more of the first network element and the second network element.

5. The method of claim 1, further comprising:
   determining a change of the link attribute based a present link attribute for the Layer 2 link and a stored link attribute for the Layer 2 link; and
   determining, by the processor, a graphical line attribute corresponding to the change of the link attribute.

6. The method of claim 1, further comprising:
   selecting a switch element from the first network element and the second network element; and
   querying the switch element for the link attribute of the Layer 2 link connecting the first network element and the second network element.

7. The method of claim 6, wherein querying the switch element for the link attribute of the Layer 2 link further comprises:
   determining the link attribute based on a change of the value over time.

8. The method of claim 1, further comprising:
   storing a history of link attributes for Layer 2 links in the network; and
   comparing the history with newly received link attributes to determine link attributes changes.

9. The method of claim 1, further comprising:
   providing a plurality of graphical line attributes as candidates to be selected to correspond to a link attribute at the graphical user interface; and receiving a selection of one of the graphical line attributes by the user.

10. Apparatus comprising:
a processor configured to:
    query a value of a counter using a Layer 3 network protocol to at least a first network element, the counter being configured to count a number of data units transmitted over a Layer 2 link, to determine a link attribute for the Layer 2 link between the first network element and a second network element in a network based on the value of the counter;
    receive a response indicative of the link attribute for the Layer 2 link, the response including at least an indication whether network traffic is flowing over the Layer 2 link between the first network element and the second network element;
    determine based on the received response a graphical line attribute corresponding to the link attribute according to a predetermined mapping of graphical line attributes to link attributes; and
    update a line element at a graphical user interface according to the graphical line attribute, the line element connecting at the graphical user interface a first graphical element corresponding to the first network element and a second graphical element corresponding to the second network element.

11. The apparatus of claim 10, wherein the processor is configured to receive the response indicative of at least one of an up/down state of the Layer 2 link, a speed of the Layer 2 link and a throughput of the Layer 2 link.

12. The apparatus of claim 10, wherein the controller processor is configured to determine the first network element to query based on a network topology stored in a database associated with the processor.

13. The apparatus of claim 10, wherein the processor is configured to receive an indication of an operational status of one or more of the first network element and the second network element.

14. The apparatus of claim 10, wherein the processor is configured to determine a change of the link attribute based a present link attribute for the Layer 2 link and a stored link attribute for the Layer 2 link and determine a graphical line attribute corresponding to the change of the link attribute.

15. The apparatus of claim 10, wherein the processor is configured to select a switch element from the first network element and the second network element and query the switch element for the link attribute of the Layer 2 link connecting the first network element and the second network element.

16. The apparatus of claim 15, wherein the processor is configured to determine the link attribute based on a change of the value over time.

17. The apparatus of claim 10, wherein:
    a memory is configured to store history of link attributes for Layer 2 links in the network; and
    the processor is configured to compare the history with newly received link attributes to determine link attributes changes.

18. The apparatus of claim 10, wherein the processor is configured to provide a plurality of graphical line attributes as candidates selected to correspond to a link attribute at the graphical user interface, and receive a selection of one of the graphical line attributes by the user.

19. A non-transitory computer readable medium storing program instructions for causing a processor to execute operations for providing Layer 2 link attributes to a user, the operations comprising:
    querying a value of a counter using a Layer 3 network protocol, by a processor, to at least a first network element, the counter being configured to count a number of data units transmitted over a layer 2 link, to determine a link attribute for the Layer 2 link between the first network element and a second network element in a network based on the value of the counter;
    receiving, by the processor, a response indicative of the link attribute for the Layer 2 link, the response including at least an indication whether network traffic is flowing over the first Layer 2 link between the first network element and the second network element;
    determining based on the received response a graphical line attribute corresponding to the link attribute according to a predetermined mapping of graphical line attributes to link attributes; and
    updating a line element at a graphical user interface according to the graphical line attribute, the line element connecting at the graphical user interface a first graphical element corresponding to the first network element and a second graphical element corresponding to the second network element.

20. The non-transitory computer readable medium of claim 19, the operations further comprising:
    determining the first network element to query based on a network topology stored in a database associated with the processor.

* * * * *